United States Patent
Khosmood et al.

(10) Patent No.: US 7,490,235 B2
(45) Date of Patent: Feb. 10, 2009

(54) OFFLINE ANALYSIS OF PACKETS

(75) Inventors: Foaad Khosmood, San Luis Obispo, CA (US); Ognjen Petrovic, Santa Clara, CA (US); Jeremy Matthew Savoy, Raleigh, NC (US); Duncan Allen Woods, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 10/961,736

(22) Filed: Oct. 8, 2004

(65) Prior Publication Data

US 2006/0080733 A1 Apr. 13, 2006

(51) Int. Cl.
*H04L 9/00* (2006.01)
(52) U.S. Cl. .................. 713/154; 713/153; 713/150
(58) Field of Classification Search .................. 713/154, 713/153, 150
See application file for complete search history.

(56) References Cited

U.S. PATENT DOCUMENTS

2003/0182580 A1 9/2003 Lee

FOREIGN PATENT DOCUMENTS

WO 03094418 A1 11/2003
WO WO 03/094418 A 11/2003

OTHER PUBLICATIONS

Packet Filtering Based on Source Router Marking and Hop-Count Ali, K.; Zulkernine, M.; Hassanein, H.; Local Computer Networks, 2007. LCN 2007. 32nd IEEE Conference on Oct. 15-18, 2007 pp. 1061-1068.*
Optimal filtering for denial of service mitigation Stephan, B.; Decision and Control, 2002, Proceedings of the 41st IEEE Conference on vol. 2, Dec. 10-13, 2002 pp. 1428-1433 vol. 2.*
Fast packet classification for two-dimensional conflict-free filters Warkhede, P.; Suri, S.; Varghese, G.; INFOCOM 2001. Twentieth Annual Joint Conference of the IEEE Computer and Communications Societies. Proceedings. IEEE vol. 3, Apr. 22-26, 2001 pp. 1434-1443 vol. 3.*
John Pescatore et al., Intrusion Detection Should Be a Function, Not a Product, http://www-csonline.com/analyst/report1660.html, Aug. 19, 2003, pp. 1-5.

* cited by examiner

*Primary Examiner*—David Y Jung
(74) *Attorney, Agent, or Firm*—Owen J. Gamon (57) ABSTRACT

A method, apparatus, system, and signal-bearing medium that, in an embodiment, filter packets received from a network based on rules. The filtering discards a subset of the packets based on the rules and keeps a remaining subset of the packets. The remaining subset is copied to a destination. The rules are created offline in a lower priority process from the filtering and copying by detecting whether symptoms exist in a sample of the remaining subset. In an embodiment, the order that the symptoms are detected is changed based on the frequency of the existence of the symptoms in the sample. In various embodiments, the symptoms may include receiving a threshold number of ping packets within a time period, receiving a threshold number of broadcast packets within a time period, receiving a packet with an invalid source address, receiving a packet with an invalid header flag, and receiving a threshold number of the packets within a time period that contain a sequence flag. In this way, firewall throughput performance is increased.

15 Claims, 7 Drawing Sheets

OFFLINE ANALYSIS OF PACKETS

FIELD

An embodiment of the invention generally relates to computers. In particular, an embodiment of the invention generally relates to offline analysis of packets for network security.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware components (such as semiconductors, integrated circuits, programmable logic devices, programmable gate arrays, power supplies, electronic card assemblies, sheet metal, cables, and connectors) and software, also known as computer programs.

Years ago, computers were isolated devices that did not communicate with each other. But, today computers are often connected in networks, such as the Internet or World Wide Web, and a user at one computer, often called a client, may wish to access information at multiple other computers, often called servers, via a network. Although this connectivity can be of great benefit to authorized users, it also provides an opportunity for unauthorized persons (often called intruders, attackers, or hackers) to access, break into, or misuse computers that might be thousands of miles away. This unauthorized access may take a wide variety of forms, but will be referred to generically herein as a denial-of-service (DoS) attack.

In a denial-of-service attack, an intruder attempts to prevent legitimate users or organizations from accessing information, resources, or services that they would normally expect to have. Typically, the loss of service is the unavailability of a particular network service, such as e-mail, or the temporary loss of all network connectivity and services. In the worst cases, for example, a Web site accessed by millions of people can occasionally be forced to temporarily cease operation. A denial-of-service attack may also destroy programming and files in a computer system, may cause system slowdowns or crashes, or may disrupt access to important online accounts, e.g., a banking account. Although often intentional and malicious, a denial-of-service attack can sometimes happen accidentally, although the destructive effect may still be the same. Denial-of-service attacks do not necessarily result in the theft of information or other security loss. Nevertheless, these attacks may still cost the target user or organization a great deal of time and money.

Although denial-of-service attacks may take many forms, one of the most common and obvious types occurs when an attacker "floods" or overloads a network with information, which is sometimes called a "broadcast storm." To understand this type of attack, consider the actions taken when a user types a URL (Universal Resource Locator) for a particular web site into a browser. This results in the browser sending a request to that site's computer server to view the identified page. But, the server can only process a certain number of requests at once, so if an attacker overloads the server with requests, the server is not able to process requests from legitimate users.

Another type of denial-of-service attack occurs when an attacker uses spam email messages to launch an attack on a target user's email account. Whether users have an email account supplied by their employers or one available through a free service such as Yahoo or Hotmail, each user is assigned a specific quota, which limits the amount of data the user is allowed to have in the account at any given time. By sending many, or large, email messages to the account, an attacker can consume the user's quota, preventing the receipt of legitimate messages.

Another type of denial-of-service attack is often referred to as a "buffer overflow attack," in which an attacker sends more traffic to a network address than the programmers who planned its data buffers anticipated someone might send. The attacker may be aware that the target system has a weakness that can be exploited, or the attacker may simply try a variety of types of attacks until one is found that works. A few of the better-known attacks based on the buffer characteristics of a program or system include: sending e-mail messages that have attachments with long file names, sending oversized Internet Control Message Protocol (ICMP) packets (this is also known as the Packet Internet or Inter-Network Groper (ping) of death), or sending email with a long "From" address.

Another type of denial-of-service attack is often referred to as a "SYN Attack." When a session is initiated between the Transport Control Program (TCP) client and server in a network, a very small buffer space exists to handle the usually rapid "hand-shaking" exchange of messages that sets up the session. The session-establishing packets include a SYN field, which identifies the sequence in the message exchange. An attacker can send a number of connection requests very rapidly and then fail to respond to the reply. This leaves the first packet in the buffer, which reduces the buffer space that the server can use to accommodate other, legitimate connection requests. Although the server drops the packet in the buffer after a certain period of time without a reply, the effect of many of these false connection requests is to slow the speed at which the server can establish legitimate requests for a session.

Another type of denial-of-service attack is often referred to as a "teardrop attack," which exploits the way that the Internet Protocol (IP) requires a packet to be divided into fragments when the packet is too large for the next router to handle. The fragment packet identifies an offset to the beginning of the first packet that enables the entire packet to be reassembled by the receiving system. In the teardrop attack, the attacker's IP puts a confusing offset value in the second or later fragment. If the receiving operating system does not have a plan for this situation, it can cause the system to crash.

In another type of denial-of-service attack, the attacker sends TCP (Transmission Control Protocol) packets with invalid flags in the header. The target server's TCP software will detect the error and discard the packet, but the act of interrogating the packet and determining that it is invalid still consumes valuable resources and processing bandwidth, especially when the server is inundated with many invalid packets.

Another type of denial-of-service attack is often referred to as a "smurf attack," in which the attacker sends an IP ping (or "echo my message back to me") request to a target server. The ping packet instructs the receiving server to broadcast the ping packet to a number of hosts within the receiving server's local network. The packet also indicates that the request is from another site, the target site that is to receive the denial-of-service. (Sending a packet with someone else's return address in it is called spoofing the return address.) The result is many ping replies flooding back to the innocent, spoofed host. If the flood is great enough, the spoofed host will no longer be able to receive or distinguish real traffic.

Computer viruses, Trojan horses, worms, or other potentially destructive code, which replicate across a network in various ways, can also be viewed as denial-of-service attacks where the victim is not usually specifically targeted but simply a host unlucky enough to get the virus. Depending on the particular virus, the denial-of-service can range from hardly noticeable all the way through completely disastrous.

Denial-of-service attacks may also be distributed, in which an attacker may use the computer of an unsuspecting user to attack another computer. By taking advantage of security vulnerabilities or weaknesses, an attacker could take control of the computers belonging to multiple unsuspecting users. The attacker then forces these computers to send large amounts of data to a web site or to send spam to particular email addresses. The attack is "distributed" because the attacker is using multiple computers to launch the denial-of-service attack.

One way that computers defend against these denial-of-service attacks is through a device commonly called a firewall. The firewall takes its name from the physical building structure that stops the spread of fire from one location to another. Analogously, a firewall in computer terms is hardware and/or software that stops an attack from entering the computer. The firewall typically examines incoming packets of data from a network and filters the malicious packets.

Current firewalls use a reactive approach where the same process handles detecting of malicious packets, filtering of the malicious packets, and routing of innocent packets. Further, the reaction of filtering and routing occurs immediately following the detection. The problem with simple reactive firewalls is that the time they take to recognize an attack by analyzing the incoming stream is taken directly from the time needed to execute existing firewall rules. Thus, the more complex the detection process, the longer the firewall takes to perform the normal operations of routing innocent network packets to their destination within the target server.

Some current firewalls have additional problems in that they may create false attack alarms due to an incomplete and inaccurate attack detection mechanism. The reason for many false alarms lies in insufficient packet analysis. Further, in existing firewalls, the packet detection process is often too tightly coupled with the network stack processing and packet filtering. For example, if the detection process has the same execution priority as the filtering process, this imposes a resource (e.g., CPU, memory) restriction on the complexity of attack detection. One technique for attempting to address the problem of attack detection and analysis is to use fast hardware implementation. Unfortunately, the hardware-based solutions are usually costly to manufacture.

Without a better way to detect and respond to denial-of-service attacks, users will continue to suffer from either reduced attack detection effectiveness or degraded throughput and false alarms.

SUMMARY

A method, apparatus, system, and signal-bearing medium are provided that, in an embodiment, filter packets received from a network based on rules. The filtering discards a subset of the packets based on the rules and keeps a remaining subset of the packets. The remaining subset is copied to a destination. The rules are created offline in a lower priority process from the filtering and copying by detecting whether symptoms exist in a sample of the remaining subset. In an embodiment, the order that the symptoms are detected is changed based on the frequency of the existence of the symptoms in the sample. In various embodiments, the symptoms may include receiving a threshold number of ping packets within a time period, receiving a threshold number of broadcast packets within a time period, receiving a packet with an invalid source address, receiving a packet with an invalid header flag, and receiving a threshold number of the packets within a time period that contain a sequence flag. In this way, firewall throughput performance is increased.

DETAILED DESCRIPTION

Figure 1:
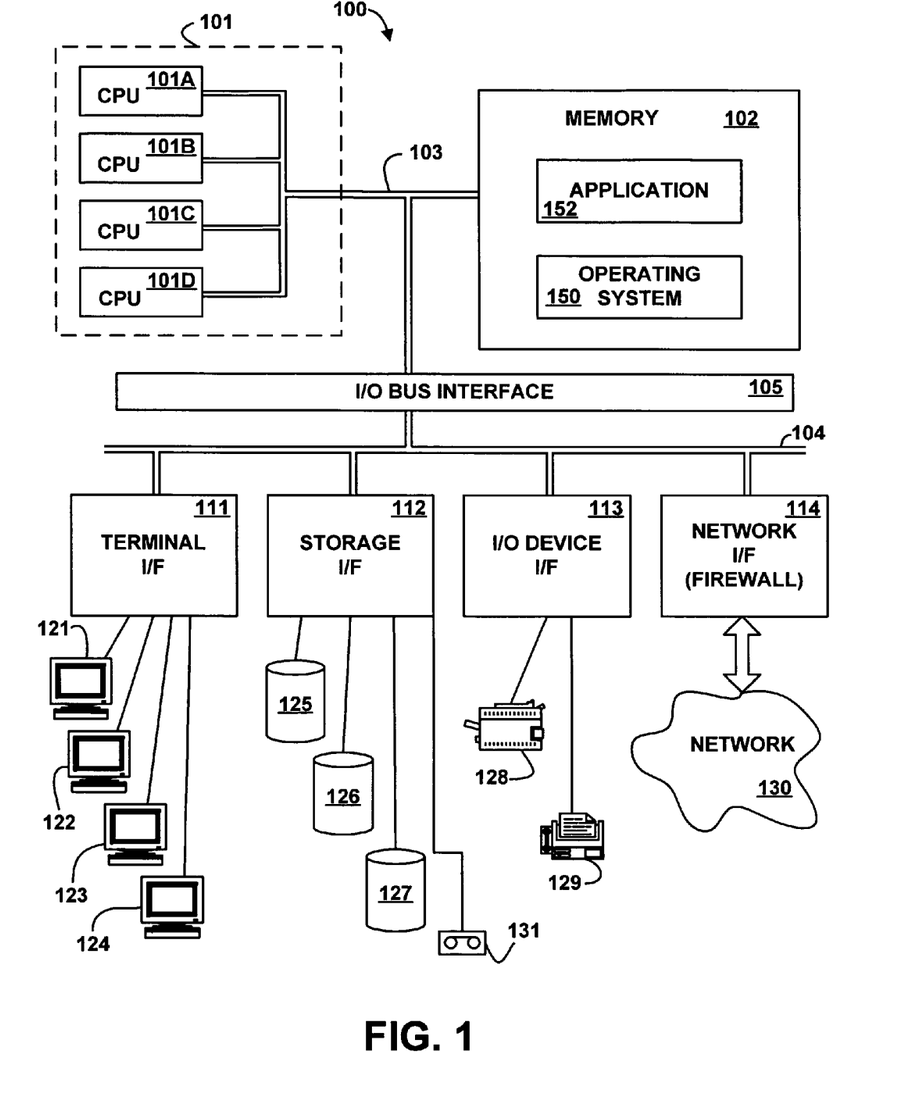
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a network 130, according to an embodiment of the present invention. The major components of the computer system 100 include one or more processors 101, main memory 102, a terminal interface 111, a storage interface 112, an I/O (Input/Output) device interface 113, and communications/network interfaces 114 (in an embodiment a firewall), all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment, the computer system 100 may alternatively be a single CPU system. Each processor 101 executes instructions stored in the main memory 102 and may include one or more levels of on-board cache.

Each processor 101 may be implemented as a single-threaded processor, or as a multithreaded processor. For the most part, each hardware thread in a multithreaded processor is treated like an independent processor by the software resident in the computer 100. In this regard, for the purposes of this disclosure, a single-threaded processor will be considered to incorporate a single hardware thread, i.e., a single independent unit of execution. It will be appreciated, however, that software-based multithreading or multitasking may be used in connection with both single-threaded and multithreaded processors to further support the parallel performance of multiple tasks in the computer 100.

The main memory 102 is a random-access semiconductor memory for storing data and programs. The main memory 102 is conceptually a single monolithic entity, but in other embodiments, the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The main memory 102 includes an operating system 150, which is software that controls the allocation and usage of hardware resources of the computer system 100 among various applications, processes, or threads, such as processing time of the processor 101, the memory 102, disk space, and peripheral devices. The operating system 150 is typically the foundation on which applications are built. In various embodiments, the operating system 150 may be implemented by OS/400, UNIX, AIX, or any other appropriate operating system. The operating system 150 includes instructions capable of executing on the processor 101 or statements capable of being interpreted by instructions that execute on the processor 101. The computer system 100 may use virtual addressing mechanisms that allow the programs of the computer system 100 to behave as if they only have access to a large, single storage entity instead of access to multiple, smaller storage entities. Thus, while the operating system 150 is illustrated as being contained within the memory 102 in the computer system 100, portions of the operation system 150 are not necessarily all completely contained in the same storage device at the same time.

The main memory 102 further includes an application or applications 152. The application is a destination or recipient of packets of data received from the network 130. Although the application 152 is illustrated in FIG. 1 as being separate from the operating system 150, in another embodiment they are packaged together or are one and the same.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiments, many other such devices may exist, which may be of differing types.

The network interface 114 provides one or more communications paths from the computer system 100 to other digital devices and computer systems; such paths may include, e.g., one or more networks 130. In various embodiments, the network interface 114 may be implemented via a firewall, a router, a modem, a LAN (Local Area Network) card, a virtual LAN card, an Internet Service Provider (ISP), a personal computer or any other appropriate network interface or combination of network interfaces. Selected components of the network interface 114 are further described below with reference to FIG. 2.

Although the memory bus 103 is shown in FIG. 1 as a relatively simple, single bus structure providing a direct communication path among the processors 101, the main memory 102, and the I/O bus interface 105, in fact, the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments, some or all of the I/O devices are connected directly to one or more system I/O buses.

The computer system 100, depicted in FIG. 1, has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In an embodiment, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line, cable, or bus. In another embodiment, the network 130 may support the Ethernet IEEE (Institute of Electrical and Electronics Engineers) 802.3× specification.

In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations. Indeed, other alternative hardware and/or software environments may be used without departing from the scope of the invention.

Figure 2:
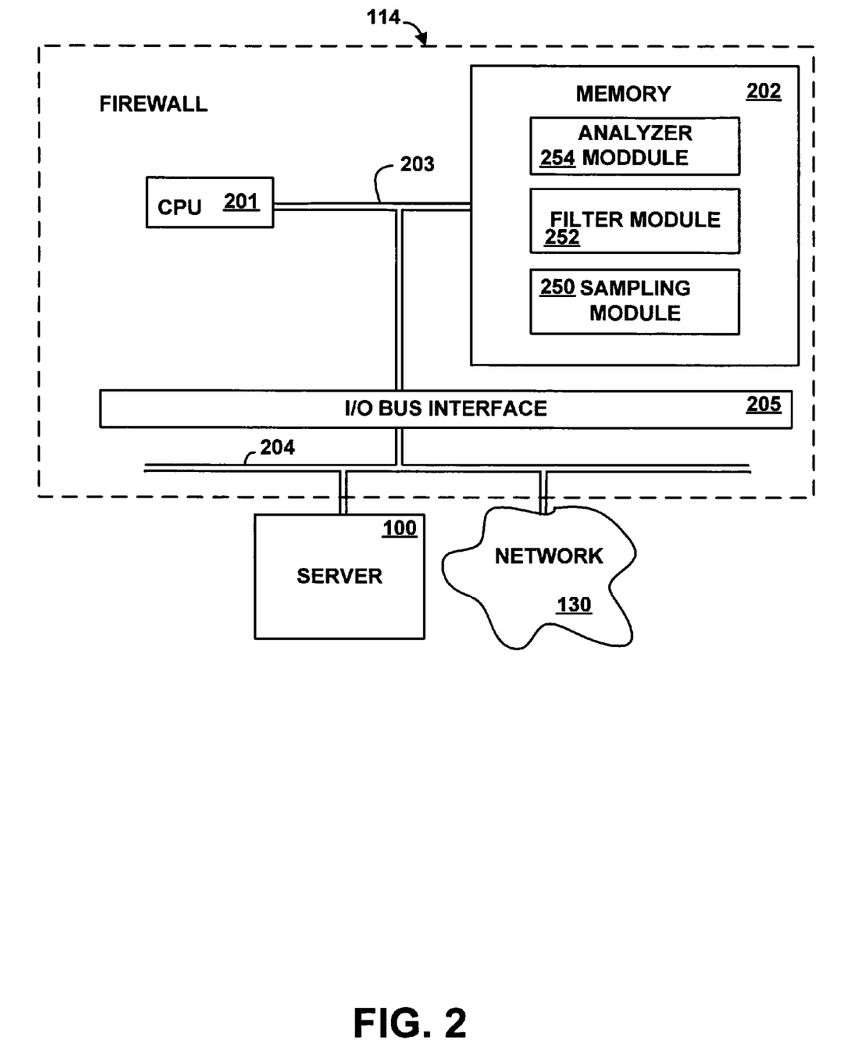
FIG. 2 depicts a block diagram of select components of the example system, according to an embodiment of the invention.

FIG. 2 depicts a block diagram of select components of the example system, according to an embodiment of the invention. The example system includes the computer system 100 (acting as a server), the firewall 114, and the network 130, all previously described above with reference to FIG. 1.

The major components of the firewall 114 include a processor 201 and main memory 202, which are coupled for inter-component communication via a memory bus 203, an I/O bus 204, and an I/O bus interface unit 205. The processor 201 executes instructions stored in the main memory 102, may include one or more levels of on-board cache, and is analogous to the processor 101, as previously described above with reference to FIG. 1.

In an embodiment, the main memory 202 is a random-access semiconductor memory for storing data and programs and is analogous to the description of the main memory 102 in FIG. 1, as previously described above. The main memory 202 may be read-only, read-write, volatile, or non-volatile. The main memory 202 includes a sampling module 250, a filter module 252, and an analyzer module 254. Although the sampling module 250, the filter module 252, and the analyzer module 254 are illustrated as being contained within the memory 202 in the firewall 114, in other embodiments, some or all of them may be on different electronic devices and may be accessed remotely. Further, while the sampling module 250, the filter module 252, and the analyzer module 254 are all illustrated as being contained within the memory 202 in the firewall 114, these elements are not necessarily all completely contained in the same storage device at the same time. In various embodiments, some or all of the sampling module 250, the filter module 252, and the analyzer module 254 may be burned into the memory 202, loaded from the server 100, received via the network 130, or loaded from an unillustrated secondary storage device. The functions of the sampling module 250, the filter module 252, and the analyzer module 254 and the flow of packets between the sampling module 250, the filter module 252, and the analyzer module 254 are further described below with reference to FIG. 3.

The memory bus 203 provides a data communication path for transferring data among the processor 201, the main memory 202, and the I/O bus interface unit 205. The I/O bus interface unit 205 is further coupled to the system I/O bus 204 for transferring data to and from the various I/O units. The I/O bus interface unit 205 communicates with the server 100 and the network 130 through the system I/O bus 204. The system I/O bus 204 may be, e.g., an industry standard PCI (Peripheral Component Interconnect) bus, or any other appropriate bus technology.

It should be understood that FIG. 2 is intended to depict the representative major components of the firewall 114 and its relationship to the server 100 and the network 130 at a high level, that individual components may have greater complexity than represented in FIG. 2, that components other than, fewer than, or in addition to those shown in FIG. 2 may be present, and that the number, type, and configuration of such components may vary. Several particular examples of such additional complexity or additional variations are disclosed herein; it being understood that these are by way of example only and are not necessarily the only such variations.

The various software components illustrated in FIG. 2 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the firewall 114, and that, when read and executed by one or more processors 201 in the firewall 114, cause the firewall 114 to perform the steps necessary to execute steps or elements embodying the various aspects of an embodiment of the invention.

Moreover, while embodiments of the invention have and hereinafter will be described in the context of fully functioning firewalls, the various embodiments of the invention are capable of being distributed as a program product in a variety of forms, and the invention applies equally regardless of the particular type of signal-bearing medium used to actually carry out the distribution. The programs defining the functions of this embodiment may be delivered to the firewall 114 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive, CD-RW, DVD-RW, DVD+RW, DVD-RAM, or diskette; or (3) information conveyed to the firewall 114 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 2 are not intended to limit the present invention. Indeed, other alternative hardware and/or software environments may be used without departing from the scope of the invention.

Figure 3:
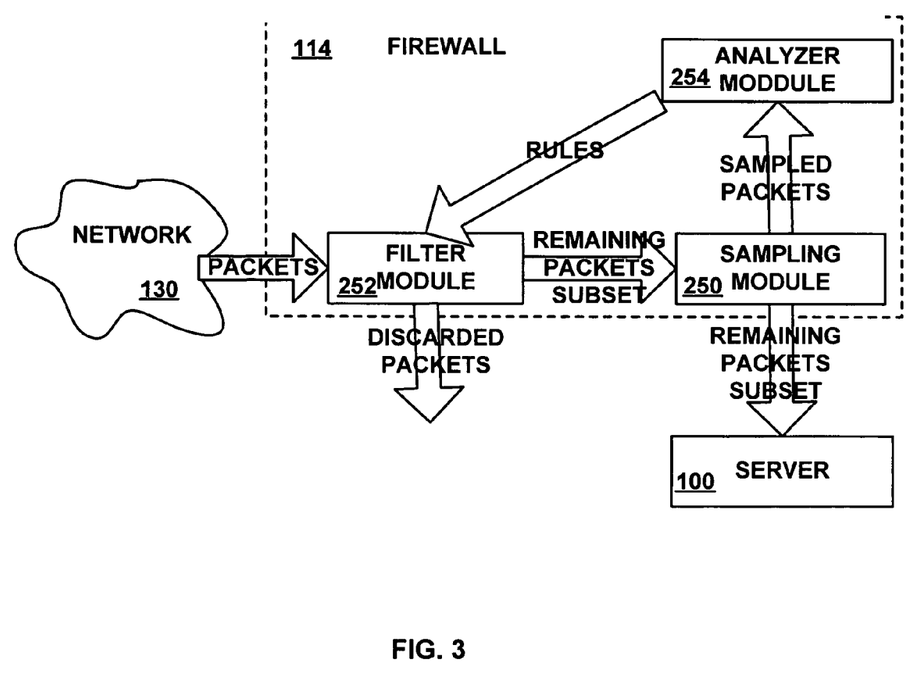
FIG. 3 depicts a block diagram showing the flow of packets in the example system, according to an embodiment of the invention.

FIG. 3 depicts a block diagram showing the flow of packets in the example system of the firewall 114 connected to the server 100 and the network 130, according to an embodiment of the invention. The filter module 252 receives a data stream of packets from the network 130 and filters the received data stream of packets based on rules, which are received from the analyzer module 254. If a received packet meets one of the rules, i.e., the received packet displays symptoms indicative of an attack by an intruder, the filter module 252 discards the packet. In various embodiments, the filter module 252 may discard the packet by moving it to a virtual trash bin or log, where it may be interrogated later if desired, or the filter module 252 may simply delete or overwrite the packet with other data, such as another packet received later. If the received packet does not meet the rules, the filter module 252 forwards the received packet to the sampling module 250. Thus, the filter module 252 filters packets based on at least one rule, discards a subset of the packets based on the rules, and forwards a remaining subset of the packets. The functions of the filter module 252 are further described below with reference to FIG. 4.

The sampling module 250 receives the remaining subset of the packets from the filter module 252 and then copies the remaining subset to a destination, such as the application 152, in the server 100. The sampling module 250 further copies a sample of the remaining subset of the received packets to the analyzer module 254. Any appropriate sampling rate may be used. Thus, the sampled packets that the sampling module 250 sends to the analyzer module 254 are a further subset of the packets that the sampling module 250 receives from the filter module 252. The functions of the sampling module 250 are further described below with reference to FIG. 5.

The analyzer module 254 receives the sampled packets from the sampling module 250 at the sampling rate and analyzes the sampled packets for symptoms of an attack from an intruder. The analyzer module 254 executes offline from the sampling module 250 and the filter module 252, meaning that the analyzer module 254 executes in a different thread, process, or job. In an embodiment, the analyzer module 254 executes at a lower priority than the filter module 252 and the sampling module 250, so as to lessen any performance impact on the functions of the filter module 252 and the sampling module 250. The functions of the analyzer module 254 are further described below with reference to FIGS. 6 and 7.

Figure 4:
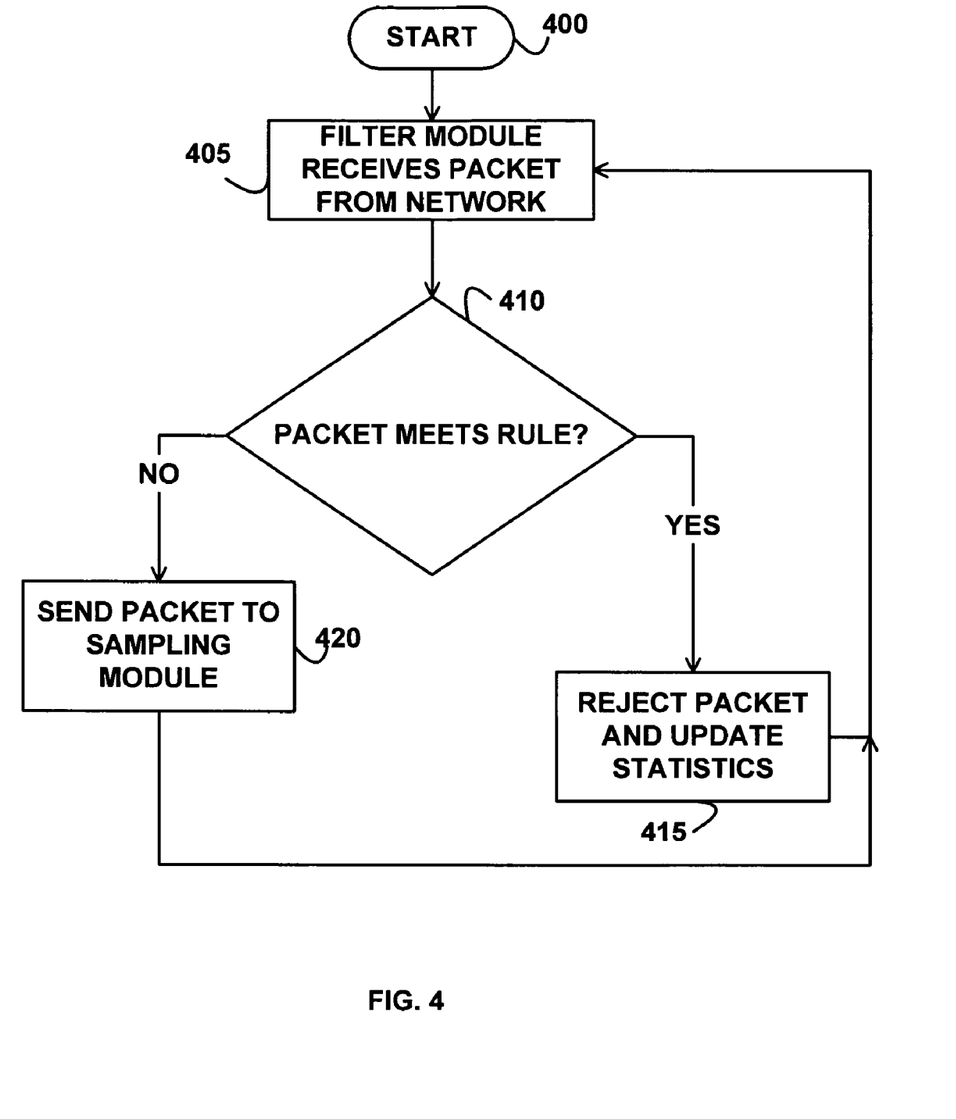
FIG. 4 depicts a flowchart of example processing for a filter module, according to an embodiment of the invention.

FIG. 4 depicts a flowchart of example processing for the filter module 252, according to an embodiment of the invention. Control begins at block 400. Control then continues to block 405 where the filter module 252 receives a packet from the network 130. Control then continues to block 410 where the filter module 252 determines whether the received packet meets a rule or rules, which the filter module 252 has previously received from the analyzer module 254 (further described below with reference to FIG. 7). If the determination at block 410 is true, then the received packet meets the rule or rules, so control continues to block 415 where the filter module 252 rejects and discards the packet and updates statistical counters that track the packets that met the rule and were discarded. The statistical counters are used as further described below with reference to FIG. 7. Control then returns to block 405 to process the next packet, as previously described above.

If the determination at block 410 is false, then the received packet does not meet the rule or rules, so control continues to block 420 where the filter module 252 sends the received packet to the sampling module 250. Control then returns to block 405, as previously described above.

Figure 5:
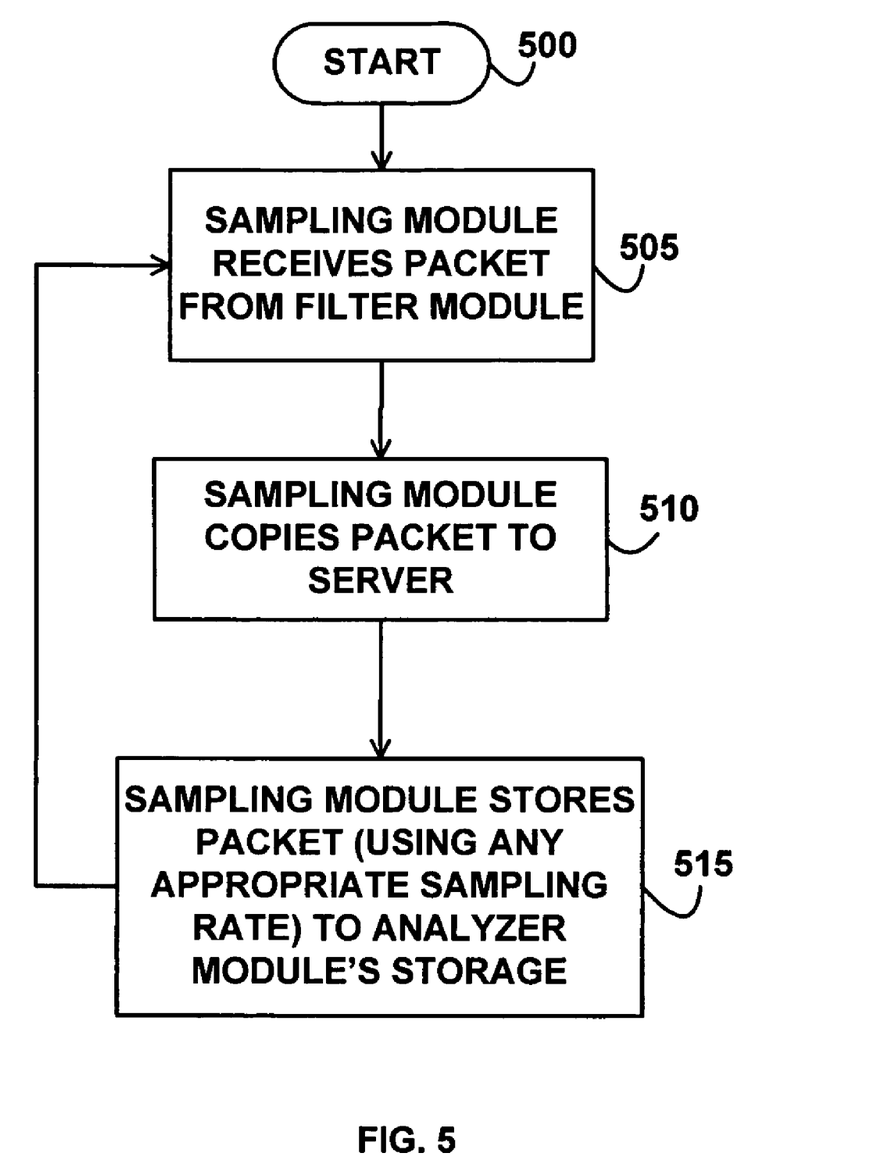
FIG. 5 depicts a flowchart of example processing for a sampling module, according to an embodiment of the invention.

FIG. 5 depicts a flowchart of example processing for the sampling module 250, according to an embodiment of the invention. Control begins at block 500. Control then continues to block 505 where the sampling module 250 receives a packet from the filter module 252. Control then continues to block 510 where the sampling module 250 copies the packet to a destination at the server 100, such as the application 152. Control then continues to block 515 where the sampling module 250 may store the packet in storage associated with the analyzer module 254 depending on the sampling rate. In another embodiment, the sampling module 250 may send the sampled packet to the analyzer module 254. Control then returns to block 505, as previously described above.

Figure 6:
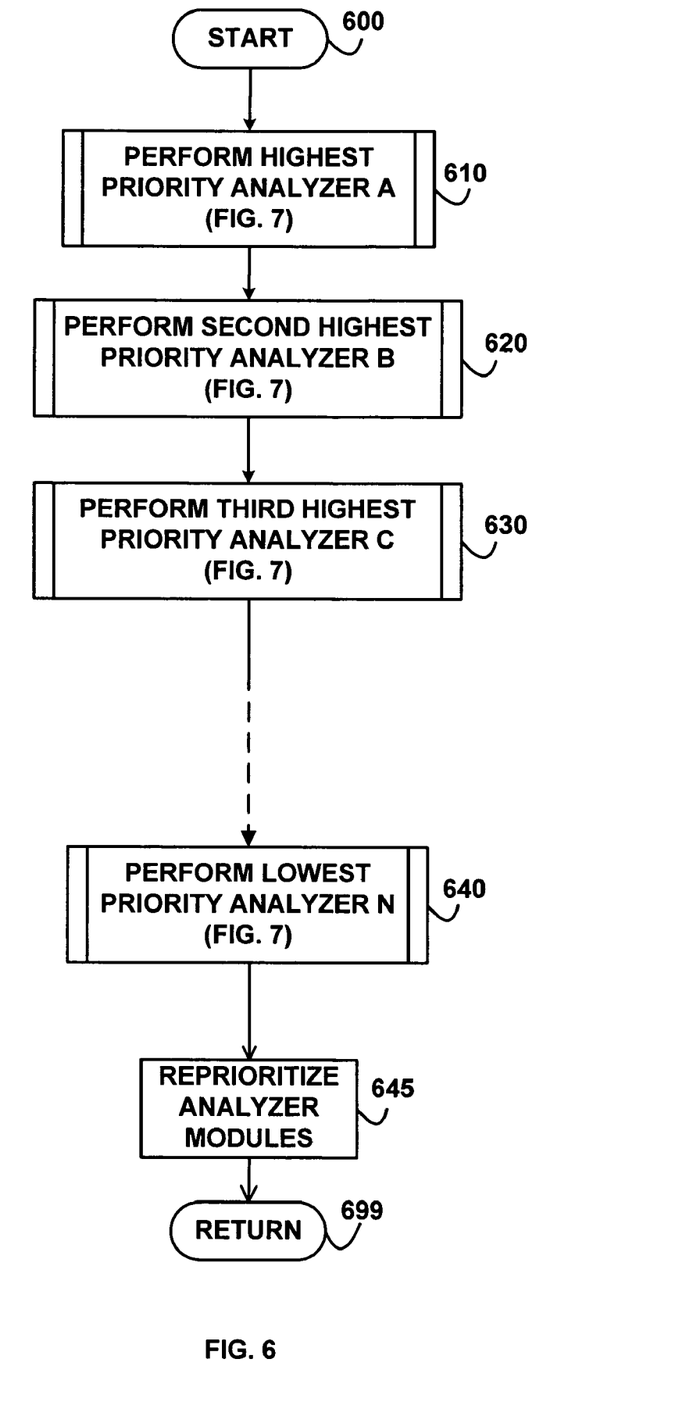
FIG. 6 depicts a flowchart of example processing for an analyzer module, according to an embodiment of the invention.

FIG. 6 depicts a flowchart of example processing for the analyzer module 254 that executes once for every sampled packet, according to an embodiment of the invention. Control begins at block 600. Control then continues to block 610 where the highest-priority analyzer module A 254 determines whether action is required for the symptom A and manages a rule A for the symptom A if necessary, as further described below with reference to FIG. 7.

Control then continues to block 620 where the second-highest priority analyzer module B 254 determines whether action is required for the symptom B and manages a corresponding rule B for the symptom B if necessary, as further described below with reference to FIG. 7.

Control then continues to block 630 where the third-highest priority analyzer module C 254 determines whether action is required for the symptom C and manages a corresponding rule C for the symptom C if necessary, as further described below with reference to FIG. 7.

Control then continues to block 640 where the lowest-priority analyzer module N 254 determines whether action is required for the symptom N and manages a corresponding rule N for the symptom N if necessary, as further described below with reference to FIG. 7. Control then continues to block 645 where control logic associated with the analyzer module 254 reprioritizes the order of execution of the analyzer modules A, B, and N 254 based on new priorities of the analyzer modules 254, which are calculated as further described below with reference to FIG. 7. For example, the next time logic of FIG. 6 is executed, the highest priority to the lowest priority analyzer modules may be different. In this way, the order of execution of detecting whether each of the symptoms exists is changed based on the frequency of each of the symptoms in the sampled packets, as further described below with reference to FIG. 7. Thus, the symptoms that occur most frequently are checked for first while the symptoms that occur the least frequently are checked for last, and so on. Control then continues to block 699 where the logic of FIG. 6 returns.

Although the analyzer modules A, B, C, and N 254 are illustrated for S corresponding symptoms A, B, C, and N and corresponding rules A, B, C, and N, respectively, in other embodiments any number of analyzer modules, symptoms and rules may be present. Further, although different modules A, B, C, and N 254 are illustrated detecting different symptoms A, B, C, and N, respectively, in other embodiments, some or all of the different symptoms A, B, C, and N may be detected by the same analyzer module 254. The symptoms A, B, C, and N and the corresponding rules A, B, C, and N are further described below with reference to FIG. 7.

Although the analyzer module A is described in FIG. 6 as being the highest-priority analyzer module, the analyzer module B is the second-highest priority, the analyzer module C is the third-highest priority, and the analyzer module N is the lowest priority, the priorities of the analyzer modules 254 may change, as further described below with reference to FIG. 7. In response to the changing of the priorities, the order of execution of the various analyzer modules A, B, C, and N 254 changes in FIG. 6.

Figure 7:
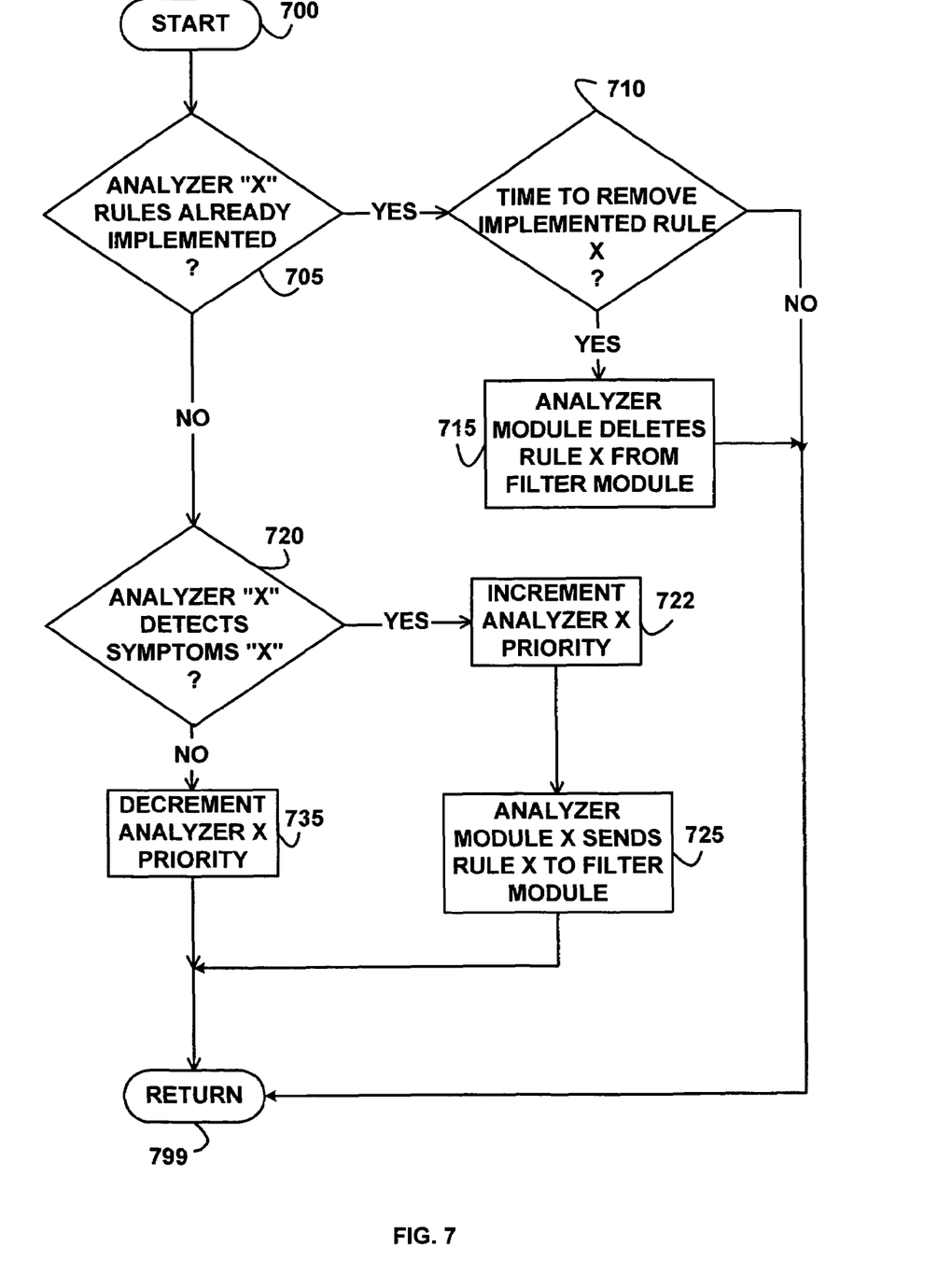
FIG. 7 depicts a flowchart of example further processing for the analyzer module, according to an embodiment of the invention.

FIG. 7 depicts a flowchart of example processing of any and all of the analyzer modules A, B, C, and N 254 (previously described above with reference to FIG. 6), according to an embodiment of the invention. Generically, FIG. 7 refers to any analyzer module A, B, C, or N as "analyzer X" 254, where "X" refers to A, B, C, or N, depending on from which block in FIG. 6 the logic of FIG. 7 was invoked.

Control begins at block 700. Control then continues to block 705 where the analyzer module X 254 determines whether the associated symptom X has previously been detected (by a previous invocation of the logic of FIG. 7 at block 720) and the associated rule X is currently implemented (by the filter module 252, as previously described above with reference to FIG. 4). If the determination at block 705 is true, then the rule X has already been implemented by the filter module 252, so control continues to block 710 where the analyzer module X 254 determines whether it is time to remove the implemented rule X by estimating whether the attacked that causes the symptom X has ceased or abated. In an embodiment, the analyzer module X 254 makes the determination by comparing the elapsed time since the rule X was implemented to a threshold, and all rules X may have the same or different thresholds. In another embodiment, the analyzer module X 254 makes the determination at block 710 by analyzing the statistics previously saved by the filter module 252, as previously described above with reference to block 415 in FIG. 4. Thus, the analyzer module 254 estimates whether the symptom X detected by the rule X is no longer occurring based on a threshold or based on the number of packets that met the rule and were discarded.

If the determination at block 710 is true, then it is time to remove the implemented rule, so control continues to block 715 where the analyzer module X 254 removes the rule X from the rule set that the filter module 252 currently enforces. Control then continues to block 799 where the logic of FIG. 7 returns.

If the determination at block 710 is false, then it is not time to remove the implemented rule, so control continues to block 799 where the logic of FIG. 7 returns.

If the determination at block 705 is false, then the associated rule X is not currently implemented by the filter module 252, so control continues to block 720 where the analyzer module X 254 determines whether the symptom X is present in the current sampled packet.

If the determination at block 720 is true, then the symptom X is present in the current sampled packet, so control continues to block 722 where the analyzer module X 254 increments or otherwise increases the priority of the analyzer module X 254. The priorities of the analyzer modules are used to sort the order of the execution of the detection of the symptoms, as previously described above with reference to FIG. 6. Control then continues to block 725 where the analyzer module X 254 sends the determined rule X to the filter module 252.

Control then continues to block 799 where the logic of FIG. 7 returns.

If the determination at block 720 is false, then the symptom X is not present in the current sample, so control continues to block 735 where the analyzer module X 254 decrements or otherwise decreases the associated priority for the analyzer module X 254. Control then continues to block 799, as previously described above.

In various embodiments, the symptoms X (symptoms A, B, C, and N as previously described above with reference to FIG. 6) and their respective rules X (rules A, B, C, and N as previously described above with reference to FIG. 6) may include any, some, or all of the following:

Ping Floods: if the analyzer module 254 detects the symptom of a number of ICMP echo requests sent to a specific target (e.g., the application 152) that exceed a threshold, the analyzer module 254 creates a rule instructing the filter module 252 to discard all echo or ping requests directed to that target for a period of time. Although the ICMP protocol is described in this example, in other embodiments any echo request format may be used.

Broadcast Storms: A broadcast packet requests the target to send the same packet to multiple destinations. Some number of broadcast packets are normal in an active network. But, when sent in excessive amounts, networks can be overwhelmed in forwarding and processing these packets. If the analyzer module 254 detects the symptom of receiving a threshold number of broadcast packets in a period of time, the analyzer module creates a rule instructing the filter module 252 to discard all broadcast packets for a period of time.

Bogons: if the analyzer module 254 detects the symptom of receiving a packet with an invalid source address, the analyzer module 254 creates a rule instructing the filter module 252 to discard all packets originating from the invalid source address.

Invalid TCP flags: if the analyzer module 254 detects the symptom of receiving a packet with an invalid flag or flags in the packet header, the analyzer module 254 creates a rule instructing the filter module 252 to discard all packets with the invalid flag or flags. Although TCP flags are described, in other embodiments flags for any appropriate protocol may be used.

SYN (sequence) floods: The SYN flood attack sends TCP connections requests faster than the target destination, e.g., the application 152 can process them. The attacker creates a random source address for each packet. The SYN flag set in each packet is a request to open a new connection to the server from the spoofed IP address. The victim destination responds to spoofed IP address, then waits for confirmation that never arrives. The victim's connection table fills up waiting for replies. After the table fills up, all new connections are ignored. Legitimate users are ignored as well, and cannot access the server. Once the attacker stops flooding the server, the server usually goes back to a normal state, so that SYN floods rarely crash servers. The SYN flood attack can be used as part of other attacks, such as disabling one side of a connection in TCP hijacking, or by preventing authentication or logging between servers. If the analyzer module 254 detects the symptom of receiving a threshold number of packets within a time period that contain the SYN flag, the analyzer module 254 creates a rule instructing the filter module 252 to discard all packets with the SYN flag set for a period of time.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized, and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention.

But, the invention may be practiced without these specific details. In other instances, well-known circuits, structures, and techniques have not been shown in detail in order not to obscure the invention.

What is claimed is:

1. A method comprising:
    filtering packets based on at least one rule, wherein the filtering discards a first subset of the packets that meet the rule and keeps a remaining subset of the packets;
    creating a sample of the remaining subset;
    detecting whether each of a plurality of symptoms exists in the sample; and
    determining the at least one rule based on the detecting, wherein the detecting and the determining execute offline in a different process from the filtering and the creating.

2. The method of claim 1, wherein the different process has a lower priority than the filtering and the creating the sample.

3. The method of claim 1, wherein the symptom comprises:
    receiving a threshold number of ping packets within a time period.

4. The method of claim 1, wherein the symptom comprises:
    receiving a threshold number of broadcast packets within a time period.

5. The method of claim 1, wherein the symptom comprises:
    receiving one of the packets with an invalid source address.

6. The method of claim 1, wherein the symptom comprises:
    receiving one of the packets with an invalid header flag.

7. The method of claim 1, wherein the symptom comprises:
    receiving a threshold number of the packets within a time period that contain a sequence flag.

8. The method of claim 1, further comprising:
    copying the remaining subset to a destination.

9. The method of claim 8, wherein the copying further comprises:
    copying the remaining subset to the destination in a same process as the filtering and the creating.

10. The method of claim 1, further comprising:
    changing an order of execution of the detecting whether each of the plurality of symptoms exists based on a frequency of each of the plurality of symptoms in the sample.

11. The method of claim 1, further comprising:
    reprioritizing an order of execution of the detecting whether each of the plurality of symptoms exists based on a presence or absence of one of the plurality of symptoms.

12. The method of claim 1, further comprising:
    periodically removing the at least one rule.

13. The method of claim 12, wherein the periodically removing the at least one rule further comprises:
    periodically removing the at least one rule based on a number of the packets that met the at least one rule and were discarded.

14. The method of claim 1, wherein the detecting further comprises:
    detecting that each of a plurality of symptoms exists in the sample in a time period.

15. The method of claim 14, wherein the determining further comprises:
    in response to the detecting that each of a plurality of symptoms exists in the sample in a time period, creating the at least one rule that instructs the filtering to discard the packets that present the plurality of symptoms.

* * * * *